(12) United States Patent
Hwang

(10) Patent No.: US 10,361,601 B2
(45) Date of Patent: Jul. 23, 2019

(54) ROTOR ASSEMBLY

(71) Applicant: DOOSAN HEAVY INDUSTRIES & CONSTRUCTION CO., LTD., Changwon-si, Gyeongsangnam-do (KR)

(72) Inventor: Kye Ha Hwang, Changwon-si (KR)

(73) Assignee: Doosan Heavy Industries Construction Co., Ltd, Gyeongsangnam-do (KR)

( * ) Notice: Subject to any disclaimer, the term of this patent is extended or adjusted under 35 U.S.C. 154(b) by 506 days.

(21) Appl. No.: 15/067,823

(22) Filed: Mar. 11, 2016

(65) Prior Publication Data
US 2017/0047806 A1    Feb. 16, 2017

(30) Foreign Application Priority Data

Aug. 11, 2015 (KR) .................. 10-2015-0113470

(51) Int. Cl.
*H02K 3/24* (2006.01)
*H02K 9/16* (2006.01)
(Continued)

(52) U.S. Cl.
CPC ............ *H02K 3/24* (2013.01); *H02K 3/51* (2013.01); *H02K 5/20* (2013.01); *H02K 9/16* (2013.01);
(Continued)

(58) Field of Classification Search
CPC .. H02K 1/32; H02K 3/24; H02K 3/51; H02K 5/20; H02K 9/12; H02K 9/16; H02K 9/19
(Continued)

(56) References Cited

U.S. PATENT DOCUMENTS 3,465,183 A * 9/1969 Wallenstein ............. H02K 3/24
310/54
4,486,676 A * 12/1984 Moore ..................... H02K 3/24
310/214
(Continued)

FOREIGN PATENT DOCUMENTS

EP          0849859 A1    6/1998
GB          1136660 A  * 12/1968 ............... H02K 3/24
(Continued)

OTHER PUBLICATIONS

Communication dated Sep. 23, 2016 issued by the Korean Patent Office in counterpart application No. 10-2015-0113470.
(Continued)

*Primary Examiner* — Alex W Mok
(74) *Attorney, Agent, or Firm* — INVENSTONE Patent, LLC

(57) ABSTRACT

Disclosed herein is a rotor assembly, including a cylindrical housing coupled to an outer circumferential surface of a rotor body and configured to house a coil turn therein, a supporting unit disposed in the housing and configured to prevent the coil turn from being pushed in an axial direction of a rotor, and a vane ring coupled to one end of the housing and provided with blades guiding cooling fluid to the coil turn. The rotor assembly may include: coil turns each of which is formed by stacking conductors in a multilayer structure and includes a linear part interposed between teeth, and a curved part extending from the linear part and disposed on an outer surface of a spindle; first supporting blocks which are inserted into the curved part and disposed between the conductors; and a second supporting block which is disposed between the first supporting blocks.

10 Claims, 7 Drawing Sheets

(51) Int. Cl.
*H02K 5/20* (2006.01)
*H02K 9/19* (2006.01)
*H02K 3/51* (2006.01)
*H02K 1/32* (2006.01)
*H02K 9/12* (2006.01)

(52) U.S. Cl.
CPC ................ *H02K 9/19* (2013.01); *H02K 1/32* (2013.01); *H02K 9/12* (2013.01)

(58) Field of Classification Search
USPC .......................................................... 310/59
See application file for complete search history.

(56) References Cited

U.S. PATENT DOCUMENTS

| | | | | |
|---|---|---|---|---|
| 5,894,178 A * | 4/1999 | Stefan | ................... | F04D 29/384 310/58 |
| 5,986,380 A | 11/1999 | Kaminski et al. | | |
| 2004/0084974 A1 | 5/2004 | Nelson | | |
| 2011/0273038 A1* | 11/2011 | Naman | ................. | F04D 25/082 310/58 |
| 2014/0183990 A1* | 7/2014 | Kanninen | ................ | H02K 9/18 310/57 |
| 2015/0303765 A1* | 10/2015 | Akiyoshi | ................. | H02K 5/20 310/59 |
| 2015/0369258 A1* | 12/2015 | Sakamoto | ................ | H02K 5/20 415/121.3 |

FOREIGN PATENT DOCUMENTS

| | | |
|---|---|---|
| JP | 2002-118998 A | 4/2002 |
| JP | 2003-088022 A | 3/2003 |
| KR | 2010-0120267 A | 11/2010 |

OTHER PUBLICATIONS

Communication dated Nov. 16, 2016 issued by the European Patent Office in counterpart application No. 16164692.2.

* cited by examiner

ROTOR ASSEMBLY

CROSS-REFERENCE TO RELATED APPLICATION

This application claims priority to Korean Patent Application No. 10-2015-0113470, filed on Aug. 11, 2015, the disclosure of which is incorporated herein by reference in its entirety.

BACKGROUND

Field

Exemplary embodiments of the present disclosure relate to a rotor assembly, and more particularly, a rotor assembly in which a structure of cooling fluid inflow, the shape of a coil turn, and a structure of supporting the coil turn are improved.

Description of the Related Art

Generally, a generator is an apparatus which converts mechanical energy into electric energy using electromagnetic induction, and which uses the principle in which electric power is generated when a conductor rotates in a magnetic field. Such a generator uses hydrogen gas and water as a cooling medium, and has a hermetically sealed structure to prevent penetration of dust or moisture and leakage of hydrogen gas.

For ventilation in the generator, a closed circulation system using a fan installed on a shaft of a rotor is employed, and a cooler for cooling hydrogen gas is installed in the generator. Furthermore, a stator houses the rotor therein, and includes a coil, a stator core around which a coil is wound, and a frame which supports them.

When the rotor rotates, current flowing through the coil generates heat. If heat generated from the coil of the rotor is not effectively dissipated, it causes deterioration in performance of the generator.

To overcome this problem, a rotor and a rotating electric machine having a structure for cooling the rotor were proposed in Korean Patent Unexamined Publication No. 2010-0120267.

However, such a conventional rotor is problematic in that because cooling fluid is drawn into space between several structures including a centering ring for supporting a rotor coil, use of only an inlet flow by a pumping head and a fan makes it difficult to efficiently cool the rotor coil.

The conventional cooling structure is a structure in which cooling of a conductor assembled in a rotor body depends on only cooling fluid which is drawn into a sub-slot.

Particularly, because a coil turn which is an assembly of conductors is configured to come into close contact with a spindle of the rotor, there is no space between coil turns, and thus the only way of cooling the coil turns has been to pass cooling fluid through vent holes formed in the coil turns. Accordingly, there is a problem in that it is difficult to efficiently cool the coil turns.

PRIOR ART DOCUMENT

Patent Document

Korean Patent Unexamined Publication No. 2010-0120267 (Publication Date: Nov. 15, 2010)

SUMMARY

An object of the present disclosure is to provide a rotor assembly in which a structure of cooling fluid inflow, the shape of a coil turn, and a structure of supporting the coil turn are improved.

Other objects and advantages of the present disclosure can be understood by the following description, and become apparent with reference to the exemplary embodiments of the present disclosure. Also, it is obvious to those skilled in the art to which the present disclosure pertains that the objects and advantages of the present disclosure can be realized by the means as claimed and combinations thereof.

In accordance with one aspect, a rotor assembly including: a cylindrical housing coupled to an outer circumferential surface of a rotor body and configured to house a coil turn therein; a supporting unit disposed in the housing and configured to prevent the coil turn from being pushed in an axial direction of a rotor; and a vane ring coupled to one end of the housing and provided with a plurality of blades guiding cooling fluid to the coil turn.

The vane ring may include an annular frame coupled to the one end of the housing, and the plurality of blades disposed on an inner circumferential surface of the frame, the blades being spaced apart from each other and oriented obliquely in one direction.

The vane ring may further include a stopper protruding from a portion of an outer circumferential surface of the frame, and the housing has a coupling depression into which the stopper is inserted.

The housing may further include a guide groove so that when the vane ring is rotated in a direction perpendicular to in a direction of insertion of the stopper in a state in which the stopper has been inserted into the coupling depression, the stopper is inserted into and moved in the guide groove.

The supporting unit may include an annular spindle ring coupled to an outer circumferential surface of a spindle extending from the rotor body, and a plurality of supporting blocks supporting the coil turn in the axial direction of the rotor.

The supporting unit may further include an annular insulation ring disposed between the coil turn and the spindle ring and coupled to the outer circumferential surface of the spindle, and an insulation block interposed between the coil turn and each of the supporting blocks.

Each of the supporting blocks may be seated at one end thereof on an outer circumferential surface of the insulation ring and extend at the other end thereof toward the housing, with a stop protrusion provided on the extending end.

The vane ring may further include a plurality of guide depressions formed in a side of the frame so that the stop protrusions of the supporting blocks are inserted into and supported in the respective guide depressions.

A plurality of holes may be formed through a planar surface of each of the supporting blocks so that the cooling fluid passes through the plurality of holes.

A plurality of holes may be formed through a planar surface of each of the insulation blocks at positions corresponding to the respective holes of the associated supporting block.

In accordance with another aspect, a rotor assembly including: a plurality of coil turns each formed of a plurality of conductors stacked in a multilayer structure, each of the coil turns having a linear part interposed between teeth, and a curved part extending from the linear part and disposed in an arc shape on an outer circumferential surface of a spindle; a plurality of first supporting blocks inserted into the curved part, the plurality of first supporting blocks being disposed in an interlayer of the conductors and supporting the conductors with respect to a radial direction of the rotor; and a second supporting block disposed between the plurality of first supporting blocks, and supporting the conductors.

Each of the first supporting blocks may have a through hole, through which cooling fluid passes in an axial direction of the rotor.

The second supporting block may have a through hole, through which cooling fluid passes in the axial direction of the rotor, and include a stop protrusion coming into contact with a portion of the curved part and supporting the curved part in the axial direction of the rotor.

A distance between the first supporting blocks and a distance between each of the first supporting blocks and the second supporting block may be increased toward an outer side of the rotor in accordance with a curvature of the curved part.

The cooling fluid may be guided to pass through the through holes of the first and second supporting blocks and flow toward the rotor body in the axial direction of the rotor.

A width (W1) of the linear part may be less than a width (W2) of the curved part.

The width (W1) of the linear part may be ½ of the width (W2) of the curved part.

A thickness (T1) of the linear part may be greater than a thickness (T2) of the curved part.

The thickness (T1) of the linear part may be two times the thickness (T2) of the curved part.

The linear part and the curved part may have a same cross-sectional area.

A rotor assembly in accordance with an exemplary embodiment of the present disclosure has a vane structure that makes it possible to omit a centering ring and is able to increase the inlet flow rate of cooling fluid, thus enhancing the efficiency of cooling a coil turn. Even though the centering ring is omitted, the present disclosure can provide a support structure that is able to effectively support the coil turn without impeding the flow of cooling fluid, thus having advantages in that the coil turn can be effectively supported, and the efficiency of cooling the coil turn can be enhanced.

Furthermore, as the shape, arrangement, and support structure of the coil turn are improved, the flow of cooling fluid can become smooth, and the cooling fluid can be guided to even the interior of the coil turn. Thereby, the efficiency of cooling the coil turn can be further enhanced.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Hereinafter, a rotor assembly in accordance with an exemplary embodiment of the present disclosure will be described in detail with reference to the attached drawings.

Figure 1:
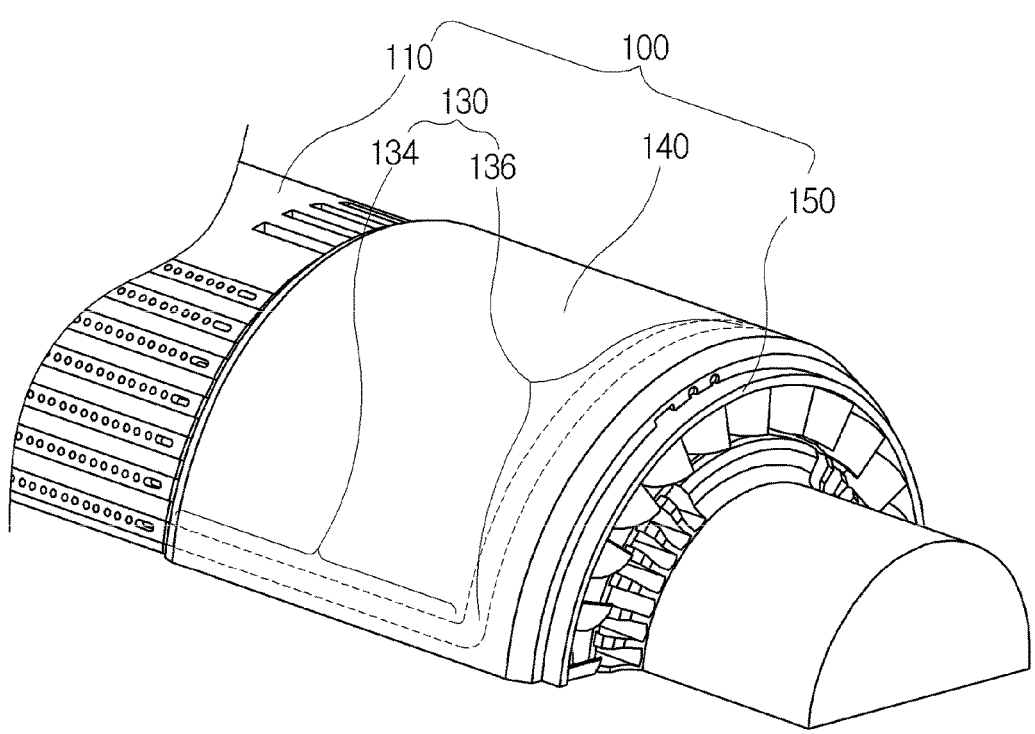
FIG. 1 is a partial perspective view illustrating a rotor assembly in accordance with an exemplary embodiment of the present disclosure.
Figure 2:
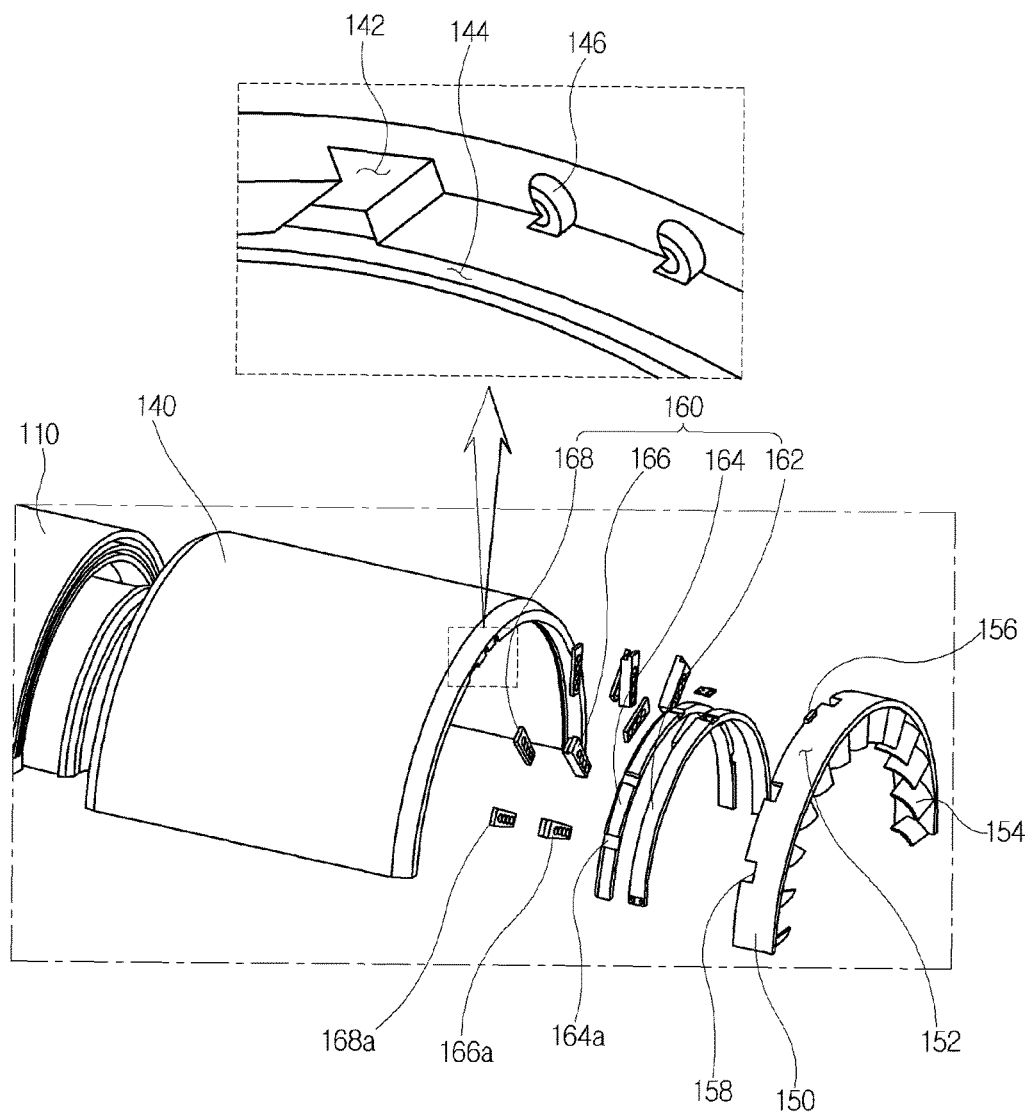
FIG. 2 is an exploded perspective view showing a part of the rotor assembly of FIG. 1.
Figure 3:
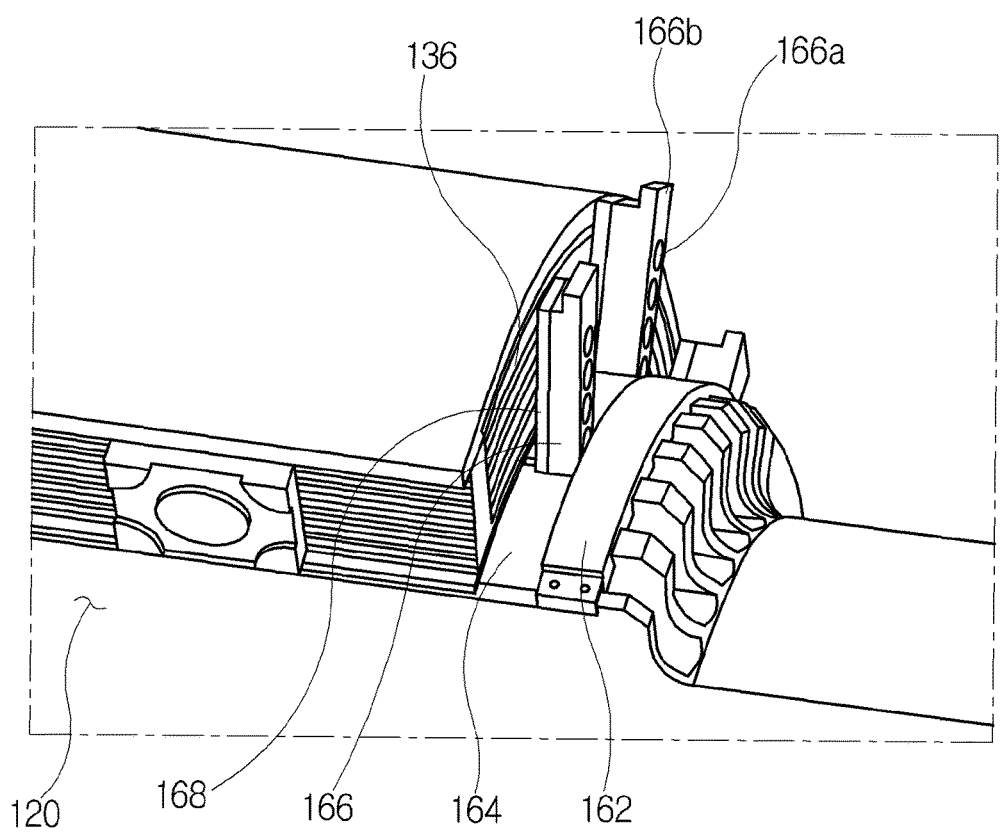
FIG. 3 is an assembled perspective view showing the part of the rotor assembly of FIG. 1.
Figure 4:
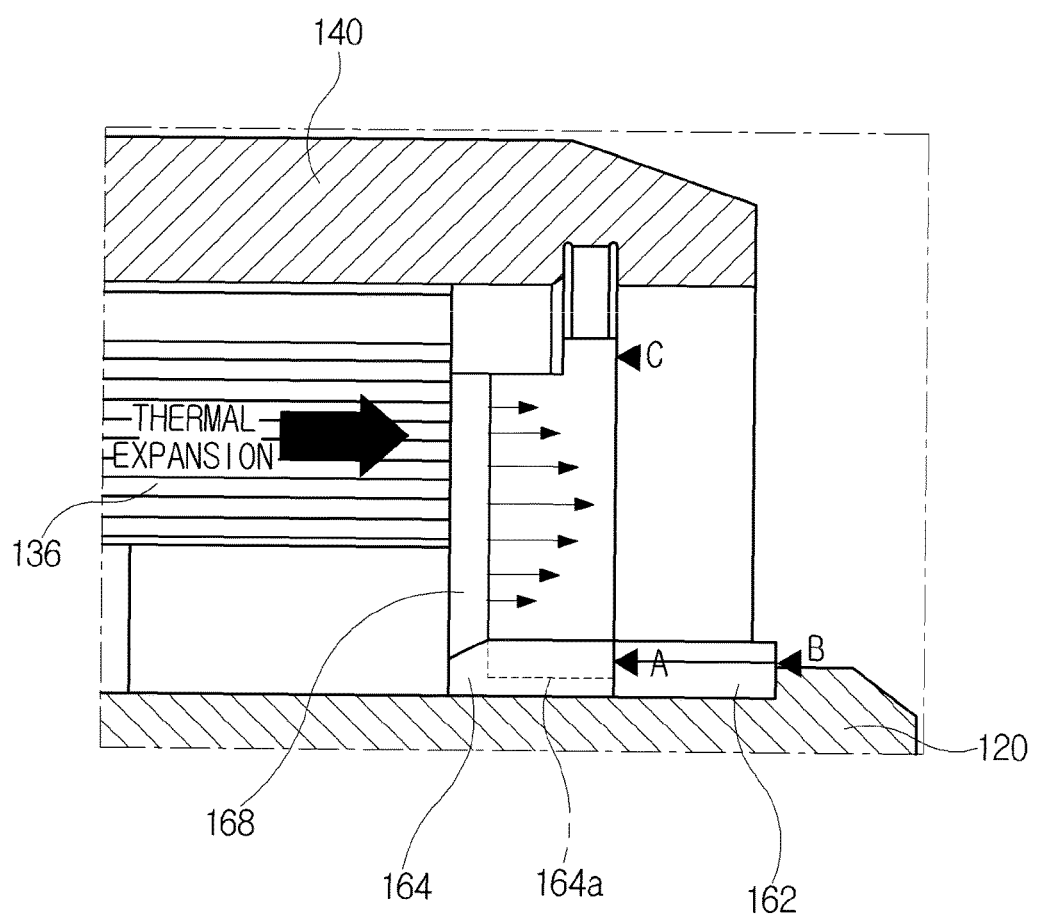
FIG. 4 is an assembled sectional view showing the part of the rotor assembly of FIG. 3.

FIG. 1 is a partial perspective view illustrating a rotor assembly in accordance with an exemplary embodiment of the present disclosure. FIG. 2 is an exploded perspective view showing a part of the rotor assembly of FIG. 1. FIG. 3 is an assembled perspective view showing the part of the rotor assembly of FIG. 1. FIG. 4 is an assembled sectional view showing the part of the rotor assembly of FIG. 3.

As shown in FIGS. 1 and 2, a rotor assembly 10 for a generator in accordance with an embodiment of the present disclosure includes a rotor 100 which is disposed in a stator so as to be rotatable, and a plurality of coil turns 130 which is disposed on an outer circumferential surface of the rotor 100.

The rotor 100 includes a rotor body 110 in which a plurality of teeth and sub-slots (not shown) are formed, and a spindle 120 which extends from one end of the rotor body 110. The coil turns 130 are disposed around the spindle 120. The coil turns 130 are housed in a housing 140 and thus prevented from being exposed outside the rotor 100. The coil turns 130 are supported by a first supporting block 170 and a second supporting block 180 (described in detail later herein).

A first end of the housing 140 is coupled to the rotor body 110, and a second end thereof is coupled to a vane ring 150. A supporting unit 160 for supporting curved parts 136 of the coil turns 130 is provided inside the housing 140.

Each of the coil turns 130 is formed by stacking a plurality of conductors (the term "conductor" has the same meaning as the term "coil") in a multilayer structure. The coil turn 130 includes a linear part 134 which is interposed between corresponding teeth, and a curved part 136 which extends from the linear part 134 and is disposed in a curved shape around an outer circumferential surface of the spindle 120.

Cooling fluid is drawn from the outside of the rotor assembly 10 into space between blades 154 of the vane ring 150 and successively cools the curved parts 136 and the linear parts 134 of the coil turns 130 via the supporting unit 160. The cooling fluid is discharged out of the rotor body 110 through ducts (not shown) formed in the linear parts 134 of the coil turns 130.

The housing 140 has a cylindrical shape. The first end of the housing 140 is coupled to the rotor body 110 by shrink-fitting, and the second thereof is coupled to the vane ring 150 so that the curved parts 136 of the coil turns 130 are covered with the housing 140. The second end of the housing 140 that is adjacent to the vane ring 150 is formed with a plurality of coupling depressions 142 which guide the location of the vane ring 150 when it is coupled to the housing 140. Furthermore, a plurality of bolt holes 146 are formed in the second end of the housing 140 at a position adjacent to the coupling depression 142 so that coupling bolts for the coupling of the vane ring 150 to the housing 140 are inserted into the respective bolt holes 146.

The coupling depression 142 is a depression having a shape corresponding to that of a stopper 156, which will be explained later herein. In detail, the coupling depression 142 is formed by depressing a portion of the second end of the housing 140 and extends along a direction in which the stopper 156 is coupled thereto.

A guide groove 144 may be formed in an inner circumferential surface of the housing 140 that is adjacent to the coupling depression 142 so that when the vane ring 150 is coupled to the housing 140, the stopper 156 which will be explained later herein is inserted into the guide groove 144. The guide groove 144 communicates with the coupling depression 142 and has a width corresponding to the size of the stopper 156. Preferably, the guide groove 144 is formed to have a length enough for the stopper 156 to rotate in the guide groove 144 when the vane ring 150 is rotated in a direction perpendicular to the direction of the insertion of the stopper 156. The guide groove 144 may be configured such that a plurality of guide grooves each extends a predetermined length from the coupling hole 142. Alternatively, the guide groove 144 may be configured such that it is formed to have a continuous annular shape along the inner circumferential surface of the housing 140.

The vane ring 150 includes an annular frame 152 which is coupled to the housing 140, and a plurality of blades 154 which are disposed on an inner circumferential surface of the frame 152.

The frame 152 having an annular shape has a width enough for the supporting unit 160, which will be described later, not to be exposed to the outside. The blades 154 are provided on the inner circumferential surface of the frame 152, and the stopper 156 to be inserted into the housing 140 is provided on an outer circumferential surface of the frame 152. Furthermore, a plurality of guide depressions 158 may be formed in an edge of the frame 152 that faces in the direction of the insertion of the stopper 156.

The blades 154 function to guide cooling fluid toward the coil turns 130 when the rotor 100 rotates. The blades 154 are spaced apart from each other at regular intervals and oriented obliquely in one direction.

The stopper 156 may comprise at least one or a plurality of stoppers and protrude outward from the outer circumferential surface of the vane ring 150 to a predetermined height. The stopper 156 is inserted into the above-mentioned coupling depression 142. After the stopper 156 has been inserted into the coupling depression 142, when the vane ring 150 is rotated in a direction perpendicular to the direction of the insertion of the stopper 156, the stopper 156 is rotated along the guide groove 144 and moved away from the coupling depression 142. In this state, when the coupling bolts are inserted into the respective bolt holes 146 and tightened, the vane ring 150 can be maintained coupled to the housing 140.

The plurality of guide depressions 158 are formed in the edge of the frame 152 that is toward the direction of the insertion of the stopper 156, and function to enable the frame 152 to support parts of the support unit 160. The guide depressions 158 also function to prevent the parts of the supporting unit 160 from being pushed toward the vane ring 150 along the axial direction of the rotor 100.

As shown in FIGS. 3 and 4, the supporting unit 160 includes a spindle ring 162 which is fitted over the spindle 120 such that it comes into close contact with an outer circumferential surface of the spindle 120, an insulation ring 164 which is interposed between the spindle ring 162 and the coil turns 130, and supporting blocks 166 which support the coil turns 130, and an insulation block 168 which is interposed between each supporting block 166 and the coil turns 130.

The spindle ring 162 may have an annular shape with a predetermined width and be coupled in close contact with the outer circumferential surface of the spindle 120. The spindle ring 162 may be made of metal having high strength. The spindle ring 162 functions to support lower reaction force that the supporting blocks 166 are pushed in the axial direction by the coil turns 130 that are thermally expanded in the axial direction of the rotor 100. To support the spindle ring 162, a seating depression (not shown) into which the spindle ring 162 is inserted may be formed in the spindle 120, and a separate support structure may be provided on the spindle 120.

The insulation ring 164 is disposed between the spindle ring 162 and the coil turns 130 and has an annular shape with a predetermined width. The insulation ring 164 is also coupled in close contact with the outer circumferential surface of the spindle 120. A plurality of seating depressions 164a into which the supporting blocks 166 are seated may be formed in an outer circumferential surface of the insulation ring 164. Due to the insulation ring 164, even though the supporting blocks 166 and the spindle ring 162 are made of metal, they can be prevented from affecting the coil turns 130.

Each of the supporting blocks 166 is seated at a first end thereof on an outer circumferential surface of the insulation ring 164 while a second end thereof extends toward the housing 140. The supporting blocks 166 are oriented in radial directions and arranged along the outer circumferential surface of the insulation ring 164, and function to support the coil turns 130 with the insulation block 168 interposed between each supporting block 166 and the coil turns 130. A stop protrusion 166b, which is inserted into the guide depression 158 of the vane ring 150, protrudes from the second end of each supporting block 166. Since the stop protrusion 166b is inserted into the guide depression 158, the lower end of the supporting block 166 is supported by the spindle ring 162 (at a support point A), and the spindle ring 162 is seated on the spindle 120 and thus secondarily supported by the spindle 120 (at a support point B). See FIG. 4. Furthermore, because the upper end of the supporting block 166 is supported by the vane ring 150 (at a support point C), the supporting blocks 166 can effectively support the force generated by thermal expansion of the coil turns 130.

That is, the supporting blocks 166 function to prevent the coil turns 130 from being pushed toward the vane ring 150 when the coil turns 130 thermally expand. However, because the supporting blocks 166 should not impede the flow of cooling fluid for cooling the coil turns, it is preferable that a plurality of through holes 166a are formed in a planar surface of each supporting block 166 (see FIGS. 2 and 3). Preferably, each of the through holes 166a formed in the supporting block 166 has a size and a shape appropriate to effectively support the expansion of the coil turns 130 but not to impede the flow of cooling fluid. The size and shape of each through hole 166a may be determined based on experimental data.

Each insulation block 168 is a block-type insulator having a shape corresponding to that of the supporting block 166, and insulates the supporting block 166 and the curved part 136 of the corresponding coil turn 130 from each other. Because the insulation block 168 should also perform the insulation function but not impede the flow of cooling fluid, through holes 168a having positions and sizes corresponding to those of the through holes 166a formed in the supporting block 166 are preferably formed in the insulation block 168.

The insulation block 168 is disposed to engage with the above-mentioned insulation ring 164 so that space among the coil turn 130, the insulation block 168 and the spindle ring 162 can be closely and reliably insulated. The insulation block 168 and the insulation ring 164 are obliquely formed on the junction at which the insulation block 168 and the insulation ring 164 engage with each other, thus facilitating the coupling and positioning.

In lieu of the centering ring which has been used to support the coil turn in the conventional technique, the supporting block in accordance with the present disclosure can substitute for the role of the centering ring. Therefore, in the present disclosure, the centering ring that has impeded the flow of cooling fluid toward the coil turn can be removed. Furthermore, the present disclosure additionally includes the vane ring so that a large amount of cooling fluid can be rapidly drawn toward the coil turns. Therefore, cooling fluid can more smoothly flow, whereby the efficiency of cooling the coil turns can be enhanced.

Meanwhile, the plurality of first supporting blocks 170 and the plurality of second supporting blocks 180 are interposed between the conductors 132 of each coil turn 130 so that flow paths can be formed to allow cooling fluid to pass through space between the coil turns 130.

Figure 5:
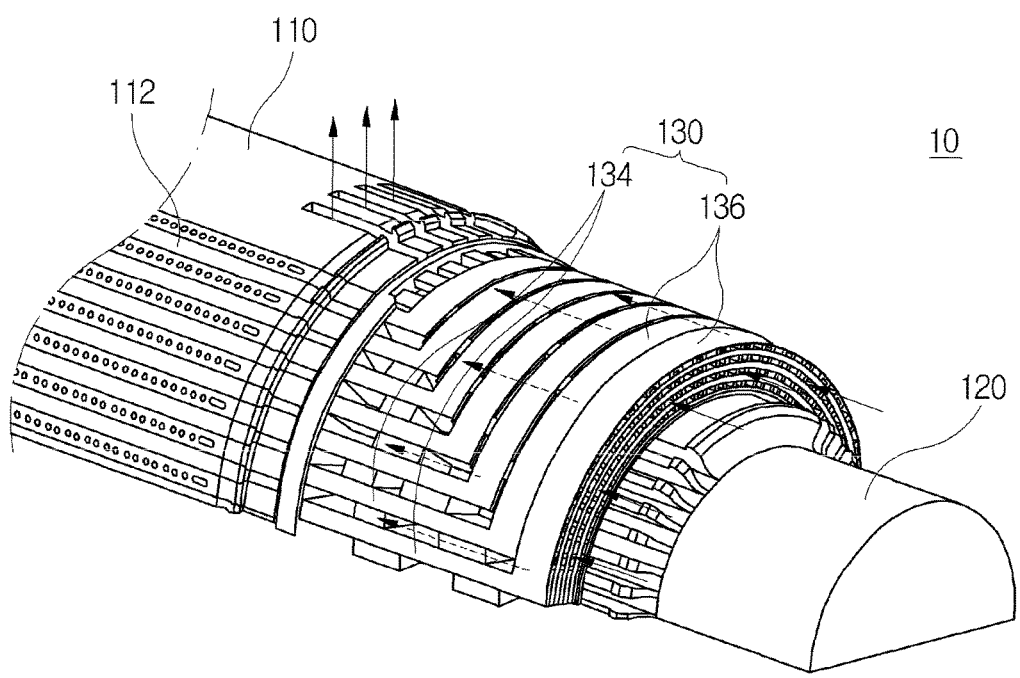
FIG. 5 is a partial perspective view showing the interior of a housing of the rotor assembly of FIG. 1.
Figure 6:
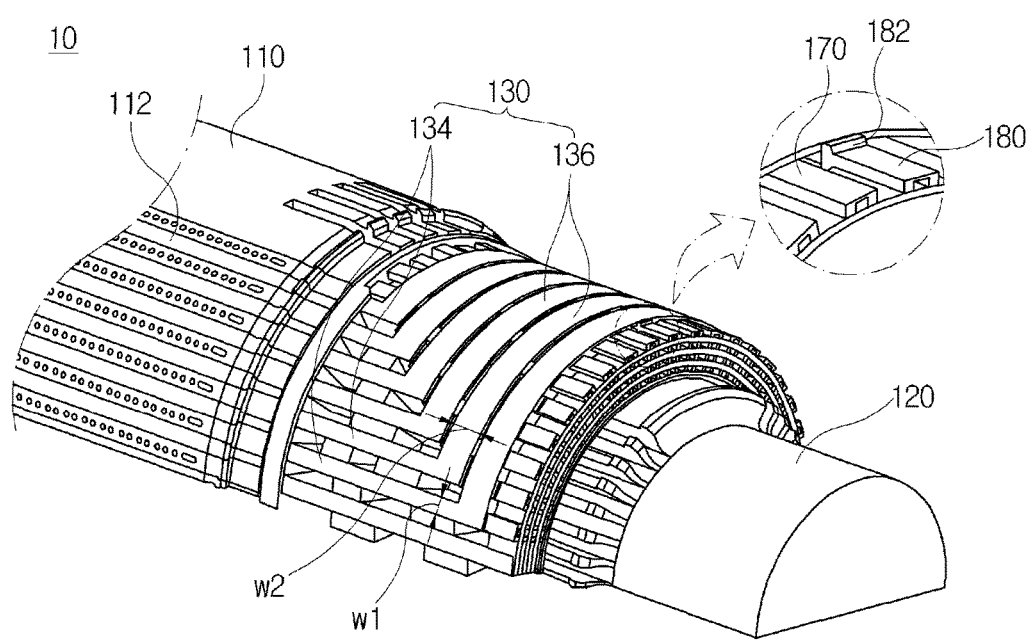
FIG. 6 is a partial perspective view showing a part of the rotor assembly according to FIG. 2.
Figure 7:
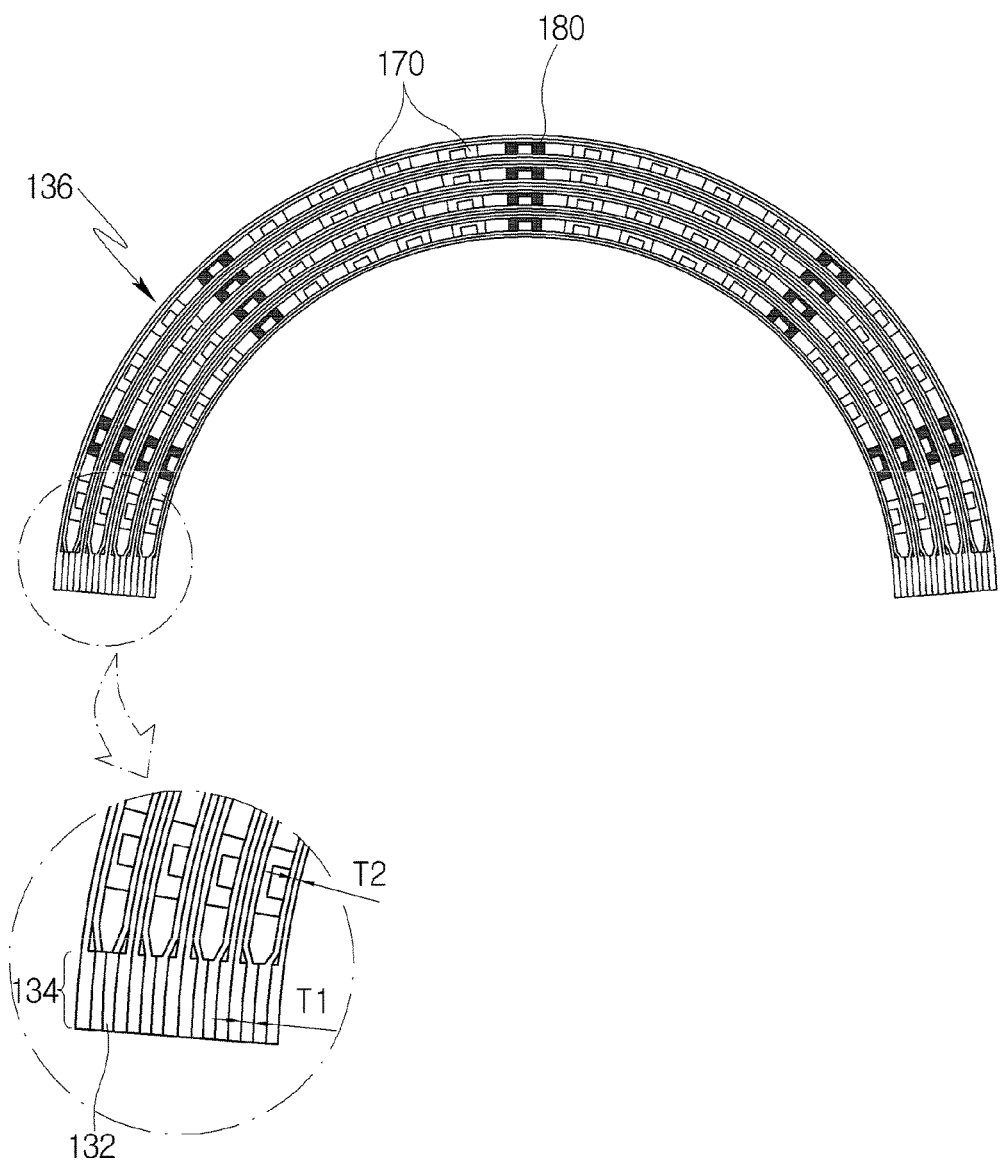
FIG. 7 is a view illustrating a coil turn of a rotor assembly in accordance with an exemplary embodiment of the present disclosure.

FIG. 5 is a partial perspective view showing the interior of the housing of the rotor assembly of FIG. 1. FIG. 6 is a partial perspective view showing a part of the rotor assembly according to FIG. 2. FIG. 7 is a view illustrating the coil turn of the rotor assembly in accordance with an exemplary embodiment of the present disclosure.

As shown in FIGS. 1 and 5, the conductors 132 are configured such that parts (linear parts) thereof that are interposed between the teeth 112 are stacked in a linear shape, and parts (curved parts) thereof extend from the stacked linear parts in an arc shape enclosing the outer circumferential surface of the spindle 120. A linear part 134 formed on one side of a multilayer stack of conductors 132 is inserted between the teeth 112 in a longitudinal direction of the rotor 100. Furthermore, a curved part 136 of the multilayer stack is disposed on the outer circumferential surface of the spindle, and a linear part 134 formed on the other side of the multilayer stack is inserted between the corresponding teeth 112 that are disposed at the other side. Such an approximately 'U'-shaped arrangement of the conductors 132 refers to a single coil turn 30. A plurality of coil turns 130 each having the above-mentioned configuration are disposed on the rotor 100 and respectively interposed between the teeth 112. Therefore, the plurality of coil turns 130 are arranged in a configuration in which the curved parts 136 thereof are reduced in size from the coil turn 130 disposed at the outermost position to the coil turn 130 disposed at the innermost position.

As shown in FIGS. 6 and 7, a thickness T1 of each conductor of the linear part 134 is greater than a thickness T2 of the conductor of the curved part 136. A width W1 of the linear part 134 is less than a width W2 of the curved part 136. Preferably, the conductor may be configured such that T1 is two times T2, and W2 is two times W1.

When current flows through the coil turn 130, heat is generated therefrom. Here, the heat value is in inverse proportion to the cross-sectional area of the coil turn 130. As the cross-sectional area of the coil turn is calculated by multiplying the width and thickness thereof, when T1 is two times T2, and W2 is two times W1, the heat values generated from the linear part 134 and the curved part 136 are consequentially equal to each other.

The reason why the coil turn has the above-mentioned configuration is because the thickness T2 of the conductor of the curved part 136 must be reduced to secure space needed to insert the first supporting blocks 170 and the second supporting blocks 180 between the conductors 132. In addition, the width W2 of the curved part 136 must be reduced so as to make the heat values of the linear part and the curved part be equal to each other. The thickness T2 of the conductor of the curved part 136 may be changed in design dimension within a range in which bending stress of the conductor 132 is allowed.

Furthermore, a plurality of ducts are formed through the linear part 134 so that cooling fluid drawn into the sub-slots can be discharged through the ducts. The ducts formed in the respective conductors 132 are located at the same positions and have the same shape. Hence, when the conductors 132 are stacked on top of one another, the ducts forms a single discharge flow path. A duct block that has a discharge port communicating with the ducts may be provided above the linear part 134.

Cooling fluid that is drawn toward the curved part 136 cools the coil turns 130 while passing through the interiors and exteriors of the coil turns 130 in the axial direction of the rotor 100. Thereafter, the cooling fluid is discharged out of the rotor 100 via the ducts of the coil turns 130 and the discharge port of the duct block (refer to the arrow of FIG. 5 indicating the flow of cooling fluid).

Meanwhile, dozens of conductors 132 are closely stacked on top of one another, thus forming a single coil turn 130. The first supporting blocks 170 and the second supporting blocks 180 are disposed in the interlayer of the conductors 132. The first supporting blocks 170 and the second supporting blocks 180 support the conductors 132 with respect to the radial direction of the rotor 100.

Each first supporting block 170 has an approximately 'U'-shaped cross-section with respect to a lateral direction (based on FIG. 6, the direction of the supporting block that corresponds to the longitudinal direction of the rotor is defined as being a longitudinal direction of the supporting block, and the direction perpendicular to the longitudinal direction is defined as being a lateral direction of the supporting block). The first supporting blocks 170 are interposed between portions of the conductors 132 that form the curved part 136, and are spaced apart from each other at regular intervals in the circumferential direction of the curved part 136 and arranged in the radial direction. Furthermore, the first supporting blocks 170 are provided with several conductor layers therebetween and are arranged in the same shape between other conductors 132. That is, the first supporting blocks 170 are disposed to have a multilayer arrangement so that a plurality of flow paths along which cooling fluid flows are formed between the conductors 132.

The first supporting blocks 170 should support the portions of the conductors 132 that form the curved part 136 without impeding the flow of cooling fluid, and thus be able to space through which cooling fluid can flow between the conductors 132. For this, each first supporting block 170 is formed in a block shape with a depression to have a 'U'-shaped lateral cross-section. However, the shape of the first supporting block 170 may be changed into different shapes, for example, a shape having a rectangular lateral cross-section with a through hole formed in the longitudinal direction in the block, so long as it allows cooling fluid to pass therethrough.

Each second supporting block 180 has the same shape as that of the first supporting block 170, but has a stop protrusion 182 which protrudes outward from one longitudinal end of the second supporting block 180. The stop protrusion 182 is disposed between one coil turn 130 and an adjacent coil turn 130, in detail, between the curved parts of the two adjacent coil turns 130. In other words, the stop protrusion 182 is disposed such that it comes into contact with side surfaces of the curved parts 136 of the coil turns 130.

The stop protrusions 182 function to space the coil turns 130 apart from each other such that the coil turns 130 are disposed at appropriate intervals without coming into close contact with each other, and support the curved parts 136 in the axial direction of the rotor 100. Although the stop protrusions 182 are provided on only several points of the curved parts 136, the distance between the coil turns 130 can be retained. Therefore, the stop protrusions 182 have only to be formed on some of the supporting blocks. Thus, the number of second supporting blocks 180 may be less than the number of first supporting blocks 170. Preferably, the second supporting blocks 180 may be disposed at positions spaced apart from each other at the same intervals in the arrangement of the first supporting blocks 170.

Preferably, the distance between the first supporting blocks 170 and the distance between each second supporting block 180 and an adjacent first supporting block 170 are increased from the conductor 132 that is close to the spindle 120 to the outside of the rotor 100. The reason for this is to arrange the supporting blocks in accordance with the curvature of the curved part 136. The distance between the first supporting blocks 170 and the distance between each second supporting block 180 and an adjacent first supporting block 170 may be changed depending on design specifications of the rotor 100.

As such, in the case where flow paths along which cooling fluid can flow are formed between the conductors 132 by the first supporting blocks 170 and the second supporting blocks 180, cooling fluid that is drawn from the spindle 120 toward the rotor body 110 in the axial direction of the rotor 100 can flow through the interior of the coil turns 130 without changing the direction in which the cooling fluid flows.

As described above, in a rotor assembly having an improved cooling path in accordance with an embodiment of the present disclosure, the shape, arrangement, and support structure of a coil turn are improved so that the flow of cooling fluid can become smooth, and the cooling fluid can be guided to even the interior of the coil turn, whereby the efficiency of cooling the coil turn can be further enhanced.

An embodiment of the present disclosure described above and shown in the drawings should not be interpreted as limiting the technical spirit of the present disclosure. The scope of the present invention is restricted by only the writing of the claims, and a person having ordinary skill in the art to which the present invention pertains may modify and change the technical spirit of the present invention in various forms. Accordingly, the modification and change may fall within the scope of the present invention as long as they are evident to those skilled in the art.

What is claimed is:

1. A rotor assembly for a rotor including a spindle that extends from one end of a rotor body, the rotor assembly comprising:
   a cylindrical housing to house a coil turn disposed around the spindle;
   an annular spindle ring seated in an outer circumferential surface of the spindle:
   an annular insulation ring interposed between the coil turn and the spindle ring and coupled to the outer circumferential surface of the spindle, the annular insulation ring having a specific width in an axial direction of the rotor;
   a plurality of supporting blocks each of which has one end seated in an outer circumferential surface of the insulation ring to support the coil turn in the axial direction of the rotor; and
   a vane ring coupled to one end of the housing and provided with a plurality of blades for guiding cooling fluid to the coil turn.

2. The rotor assembly according to claim 1, wherein the vane ring comprises an annular frame coupled to the one end of the housing, and the plurality of blades disposed on an inner circumferential surface of the frame, the blades being spaced apart from each other and oriented obliquely in one direction.

3. The rotor assembly according to claim 1, wherein the vane ring further comprises a stopper protruding from a portion of an outer circumferential surface of the frame, and the housing has a coupling depression into which the stopper is inserted.

4. The rotor assembly according to claim 3, wherein the housing further comprises a guide groove so that when the vane ring is rotated in a direction perpendicular to a direction of insertion of the stopper in a state in which the stopper has been inserted into the coupling depression, the stopper is inserted into and moved in the guide groove.

5. The rotor assembly according to claim 1, further comprising an insulation block interposed between the coil turn and each of the supporting blocks.

6. The rotor assembly according to claim 1, wherein each of the supporting blocks has an opposite end that is disposed opposite to the one end and extends toward the housing, the opposite end of each supporting block including a stop protrusion inserted into a guide depression formed in the vane ring.

7. The rotor assembly according to claim 5, wherein a plurality of holes are formed through a planar surface of each of the supporting blocks so that the cooling fluid passes through the plurality of holes.

8. The rotor assembly according to claim 7, wherein a plurality of holes are formed through a planar surface of each of the insulation blocks at positions corresponding to the respective holes of the associated supporting block.

9. The rotor assembly according to claim 1, wherein each supporting block includes:
   a lower end that supports the coil turn in the axial direction of the rotor and is supported by a surface of the spindle ring; and
   an upper end that supports the coil turn in the axial direction of the rotor and is supported by a surface of the vane ring.

10. The rotor assembly according to claim 9, wherein the spindle ring includes:
    a first support point for supporting the lower end of the supporting block; and
    a second support point that is disposed opposite to the first support point and is supported by a seating recess formed in the spindle to seat the spindle ring.

* * * * *